(12) United States Patent
Ickin et al.

(10) Patent No.: US 12,262,230 B2
(45) Date of Patent: Mar. 25, 2025

(54) METHODS, APPARATUS AND COMPUTER-READABLE MEDIUMS RELATING TO DETECTION OF SLEEPING CELLS IN A CELLULAR NETWORK

(71) Applicant: Telefonaktiebolaget LM Ericsson (publ), Stockholm (SE)

(72) Inventors: Selim Ickin, Stocksund (SE); Daniel Wilson, Jackson, NJ (US); Lackis Eleftheriadis, Gävle (SE); Leonid Mokrushin, Uppsala (SE); Ravi Kiran Kotty, Hyderabad (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 713 days.

(21) Appl. No.: 17/268,809

(22) PCT Filed: Aug. 20, 2018

(86) PCT No.: PCT/EP2018/072423
§ 371 (c)(1),
(2) Date: Feb. 16, 2021

(87) PCT Pub. No.: WO2020/038544
PCT Pub. Date: Feb. 27, 2020

(65) Prior Publication Data
US 2021/0168638 A1  Jun. 3, 2021

(51) Int. Cl.
*H04W 24/08* (2009.01)
*G06N 20/00* (2019.01)
*H04L 41/147* (2022.01)

(52) U.S. Cl.
CPC ............ *H04W 24/08* (2013.01); *G06N 20/00* (2019.01); *H04L 41/147* (2013.01)

(58) Field of Classification Search
CPC ... H04L 41/145; H04L 41/147; H04L 41/149; H04L 43/08; H04W 24/08; G06N 20/00
See application file for complete search history.

(56) References Cited

U.S. PATENT DOCUMENTS 10,517,136 B1 * 12/2019 Chukka ................ H04W 24/04
2006/0063521 A1   3/2006 Cheung et al.
(Continued)

FOREIGN PATENT DOCUMENTS

WO    2012177430 A1   12/2012

OTHER PUBLICATIONS

International Search Report and Written Opinion of the International Searching Authority for PCT International Application No. PCT/EP2018/072423 dated Sep. 27, 2018.
(Continued)

*Primary Examiner* — Pao Sinkantarakorn
(74) *Attorney, Agent, or Firm* — Sage Patent Group

(57) ABSTRACT

The disclosure provides methods, apparatus and machine-readable mediums for the detection of sleeping cells in a cellular network. A method of detecting a sleeping cell in a cellular communication network comprises: monitoring power consumption of a radio transmission point of the cellular communication network; providing the power consumption of the radio transmission point as an input to a classification model, developed using a machine-learning algorithm; and obtaining an output from the classification model, the output classifying the radio transmission point as serving one of a sleeping cell and a non-sleeping cell.

20 Claims, 7 Drawing Sheets

(56) References Cited

U.S. PATENT DOCUMENTS

| | | | |
|---|---|---|---|
| 2006/0128371 A1* | 6/2006 | Dillon | H04W 24/00 455/423 |
| 2009/0021300 A1* | 1/2009 | Romano | G01R 31/2822 330/2 |
| 2014/0211638 A1* | 7/2014 | Huang | H04W 24/06 370/249 |
| 2017/0063621 A1 | 3/2017 | Sanneck et al. | |
| 2017/0317873 A1* | 11/2017 | Hévizi | H04L 41/0661 |
| 2020/0053591 A1* | 2/2020 | Prasad | H04W 28/0268 |
| 2021/0201078 A1* | 7/2021 | Yao | G06N 3/08 |

OTHER PUBLICATIONS

Chernogorov et al., "Sequence-based Detection of Sleeping Cell Failures in Mobile Networks," Wireless Networks vol. 22 (2016) pp. 1-26.

Chernov et al., "Anomaly Detection Algorithms for the Sleeping Cell Detection in LTE Networks," 2015 IEEE 81st Vehicular Technology Conference, VTC Spring 2015—Proceedings, pp. 1-5.

Hochreiter et al., "Long Short-Term Memory," Neural Computation 9(8): 1735-1780 (Nov. 1997) pp. 1-32.

Krizhevsky et al., "ImageNet Classification with Deep Convolutional Neural Networks," Communications of the ACM (May 2017) pp. 1-9.

Mcmahan et al., "Federated Learning: Collaborative Machine Learning without Centralized Training Data," Google AI Blog, (2017) https://ai.googleblog.com/2017/04/federated-learning-collaborative.html.

Chernogorov et al., "Data Mining Approach to Detection of Random Access Sleeping Cell Failures in Cellular Mobile Networks," arXiv:1501.03935 (2015) pp. 1-32.

Vu et al., "Deep Network for Simultaneous Decomposition and Classification in UWB-SAR Imagery," Computer Science, Engineering 2018 IEEE Radar Conference (RadarConf18) pp. 1-6.

\* cited by examiner

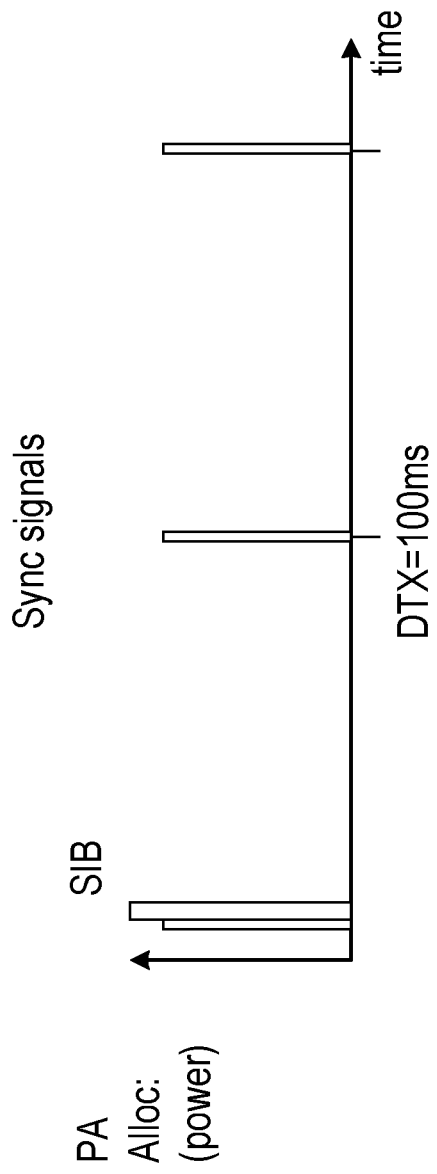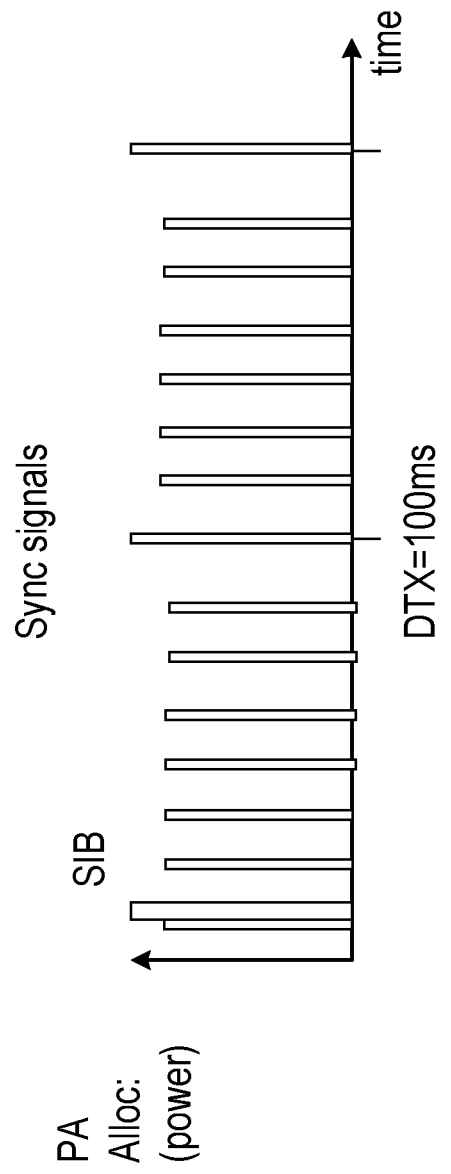

METHODS, APPARATUS AND COMPUTER-READABLE MEDIUMS RELATING TO DETECTION OF SLEEPING CELLS IN A CELLULAR NETWORK

CROSS REFERENCE TO RELATED APPLICATION

This application is a 35 U.S.C. § 371 national stage application of PCT International Application No. PCT/EP2018/072423 filed on Aug. 20, 2018, the disclosure and content of which is incorporated by reference herein in its entirety.

TECHNICAL FIELD

Embodiments of the present disclosure relate to cellular networks, and particularly to methods, apparatus and computer-readable mediums relating to detection of sleeping cells in a cellular network.

BACKGROUND

Cellular networks are a ubiquitous part of our modern world, and are becoming increasingly complex and diverse. Each network may comprise many hundreds or thousands of cells, with the deployment of small cells providing additional coverage for macro cells and resulting in increased complexity. Each network may provide multiple different radio access technologies (RATs), with new releases regularly being issued for each RAT. Further, this complexity is only expected to grow further in the future, with the advent of 5G standards providing radio access services for a wide range of terminal devices and corresponding use cases, including enhanced mobile broadband (eMBB), massive machine type communications (mMTC) and ultra-reliable low-latency communications (URLLC).

In order to ensure correct (or even optimal) functioning of the network, operators will typically attempt to monitor the performance of network components and cells in their respective networks. However, given the complexity of the networks, this is not a straightforward task. A wide range of different metrics and key performance indicators (KPIs) may be measured to monitor the performance of network components and cells, and this will increase the complexity of the task. Even with all available data, it may not be straightforward to identify a malfunctioning cell or network component given the wide range of use cases which are provided by the network. For example, the performance of a cell providing predominantly mMTC services to its connected devices will appear very different to that of a cell providing predominantly eMBB services to its connected devices. Therefore malfunctioning in those cells can also be expected to appear different.

One problem which has been identified in cellular networks is the existence of so-called "sleeping cells". Sleeping cells are cells which have developed a fault which causes partial or complete degradation of network performance in that cell. The degradation in performance may take place gradually, over a period of time, such that traditional fault detection mechanisms (which may rely on threshold comparison or other methods) fail to detect the problem.

The root cause of the sleeping cell can vary. For example, a hardware component in the base station may have failed or developed a fault, leading to reduced performance. Alternatively, software running in the base station may lead to misconfiguration of the radio signals transmitted or detected by the base station. These hardware and/or software problems can lead to negative impacts on the service provided by the cell, from marginally worse performance to complete absence of service. For example, a paper by Chernogorov et al ("Sequence-based Detection of Sleeping Cell Failures in Mobile Networks", Wireless Networks, October 2015) discusses the problem of random access channel (RACH) failure in a cell, leading to a sleeping cell. In this failure mechanism, the RACH becomes misconfigured such that random access attempts by new devices seeking to connect to the cell will always fail. Thus devices which connected to the cell prior to the RACH misconfiguration will continue to receive coverage, but new devices are unable to connect. Over time, the number of connected devices will fall to zero. However, traditional KPIs will be unable to distinguish this situation from a healthy cell which merely has a light load.

The Chernogorov paper addresses this problem through the use of N-gram analysis of minimization of drive tests (MDT) event sequences. MDT was standardized by the $3^{rd}$ Generation Partnership Program (3GPP), and is designed for automatic collection and reporting of user measurements, where possible complemented with location information. The collected data is then reported to the serving cell, which in turn sends it to an MDT server for analysis. The Chernogorov paper proposes the use of N-gram analysis of this data to identify anomalies and subsequently sleeping cells.

One problem with this approach is its sheer complexity. The N-gram analysis relies on large quantities of data collected for each monitored cell, requiring use of a large number of sensors which are capable of highly accurate measurement, as well as a long period of time in which to collect the data. Such a large quantity of data implies significant signaling overhead in providing the data from the user devices to the MDT server, as well as high data storage costs at the MDT server itself. Finally, the N-gram analysis of that data is likely to consume significant processing resources and time.

SUMMARY

Embodiments of the disclosure seek to address one or more of these and other problems.

In one aspect, there is provided a method of detecting a sleeping cell in a cellular communication network. The method comprises: monitoring power consumption of a radio transmission point of the cellular communication network; providing the power consumption of the radio transmission point as an input to a classification model, developed using a machine-learning algorithm; and obtaining an output from the classification model, the output classifying the radio transmission point as serving one of a sleeping cell and a non-sleeping cell.

Apparatus for performing the method set out above, such as a network node, is also provided.

For example, one aspect provides a network node for detecting a sleeping cell in a cellular communication network. The network node comprises processing circuitry and a non-transitory computer-readable medium storing instructions which, when executed by the processing circuitry, cause the network node to: monitor power consumption of a radio transmission point of the cellular communication network; provide the power consumption of the radio transmission point as an input to a classification model, developed using a machine-learning algorithm; and obtain an output from the classification model. The output classifies the radio transmission point as serving one of a sleeping cell and a non-sleeping cell.

In another example, a further aspect provides a network node for detecting a sleeping cell in a cellular communication network. The network node comprises a monitoring module and a classification module. The monitoring module is configured to monitor power consumption of a radio transmission point of the cellular communication network. The power consumption of the radio transmission point is provided as an input to the classification module 804, which implements a classification model, developed using a machine-learning algorithm, and obtains an output from the classification model. The output classifies the radio transmission point as serving one of a sleeping cell and a non-sleeping cell.

A further aspect of the disclosure provides a non-transitory computer-readable medium storing instructions which, when executed by processing circuitry of a network node of a cellular communication network, cause the network node to: monitor power consumption of a radio transmission point of the cellular communication network; provide the power consumption of the radio transmission point as an input to a classification model, developed using a machine-learning algorithm; and obtain an output from the classification model. The output classifies the radio transmission point as serving one of a sleeping cell and a non-sleeping cell.

BRIEF DESCRIPTION OF THE DRAWINGS

For a better understanding of the present disclosure, and to show how it may be put into effect, reference will now be made, by way of example, to the accompanying drawings, in which:

FIGS. 3a and 3b show power consumption patterns of a base station;

DETAILED DESCRIPTION

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not to obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 1:
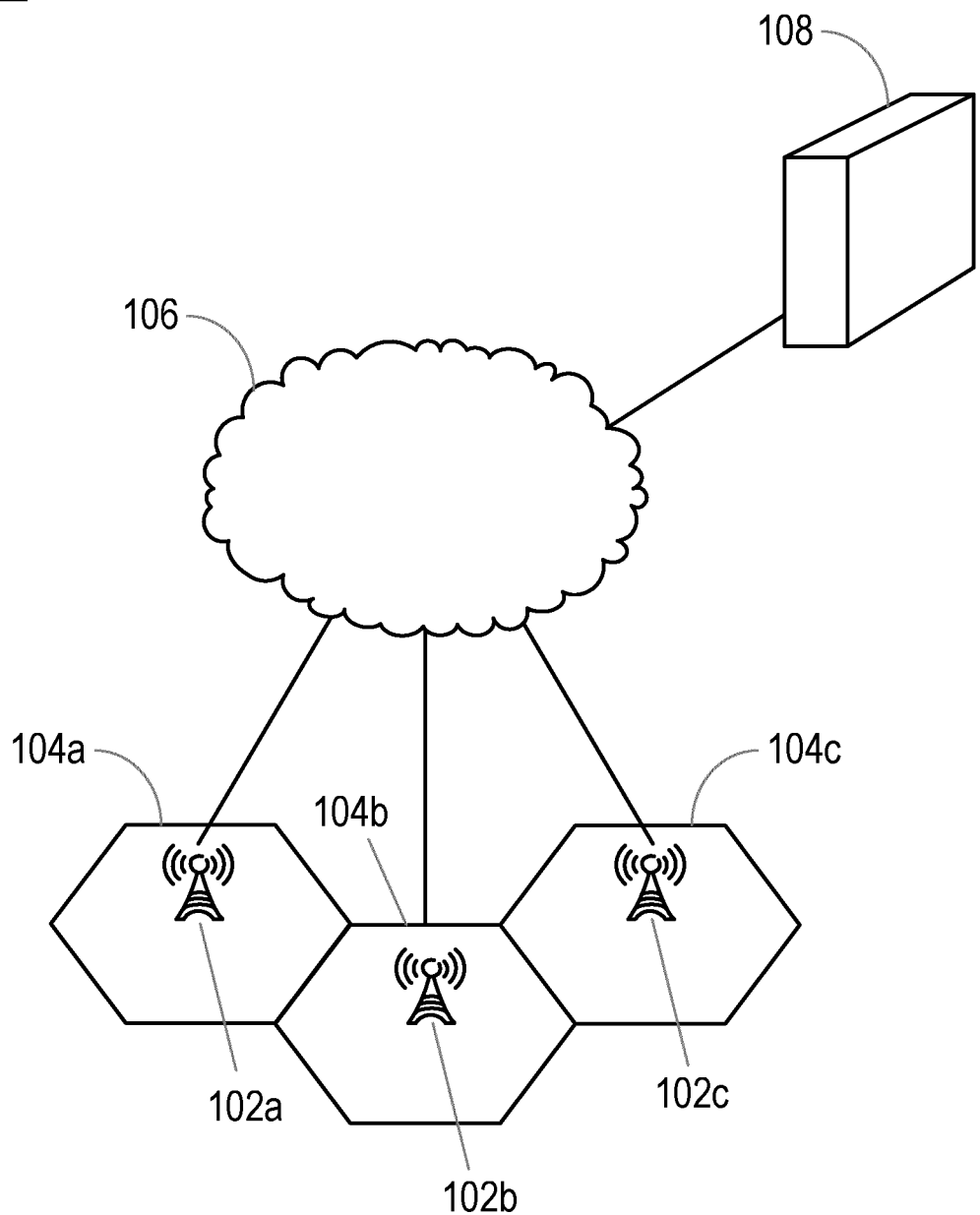
FIG. 1 illustrates a communication network according to embodiments of the disclosure.

FIG. 1 shows a communication network 100 according to embodiments of the disclosure. Those skilled in the art will appreciate that numerous components have been omitted from the illustration in order to focus on those components essential to a description of the concepts set out herein.

The network 100 comprises a cellular network, having a plurality of cells 104a, 104b, 104c (collectively, 104) served by respective base stations 102a, 102b, 102c (collectively 102). In the illustrated embodiment, the cellular network comprises three cells and a corresponding number of base stations. However, it will be understood that the cellular network may comprise any number of cells, and will typically comprise more than three cells. Further, it will be understood that each base station may serve more than one cell.

Each base station 102 (which may also be called a NodeB, eNodeB, gNodeB, etc) comprises one or more radio transmission points for transmitting radio signals to wireless terminal devices (e.g., UEs) which are connected to its respective cell 104, and for receiving radio signals transmitted by those wireless terminal devices. The radio transmission points may be located at the site of the base station, or remote from it (such as, for example, in a distributed configuration where the base station comprises a central unit and one or more distributed units for transmitting and receiving radio signals).

Each of the base stations 102 is coupled, via a packet-switched network (such as a backhaul network and/or a core network of the network 100) 106, to a server 108. The server 108 may comprise or form part of an operations support system (OSS) for the network 100. Alternatively or additionally, the server 108 may be located in a server facility which is remote from the network operator (e.g., in the cloud).

In the illustrated embodiment, the cells 104 are neighbouring cells, in the sense that the first cell 104a shares a border with the second cell 104b, which also shares a border with the third cell 104c. Further, as will be apparent from the illustration and the further explanation below, each of the cells 104 comprises the components and operative connections (e.g., to the server 108) to benefit from embodiments of the disclosure and to be monitored for detection as a sleeping cell. However, in other embodiments, only some of the cells in a cellular network may comprise the components and operative connections to benefit from embodiments of the disclosure, and these cells may be neighbouring or non-neighbouring cells; that is, the embodiments may apply to only a subset of cells of a cellular network such that only that subset of cells is monitored.

According to embodiments of the disclosure, the power consumption (and particularly the power consumption pattern) of a radio transmission point is monitored to detect whether a cell served by that radio transmission point is a sleeping cell or not. Thus power consumption data is input to a classification model developed, using a machine-learning algorithm, which generates an output classifying the radio transmission as serving one of a sleeping cell and a non-sleeping cell.

In particular, it can be expected that the power consumption pattern of a radio transmission point serving a sleeping cell will be different from the power consumption pattern of radio transmission point serving a non-sleeping cell. The changes in the pattern may vary widely. For example, a radio transmission point may consume more power due to a deadlock state, or less power as some of the processes are killed and no longer run. A classification model which has been suitably trained (e.g., as described below with respect to FIG. 5) is able to identify power consumption patterns which are indicative of sleeping cells (and conversely, non-sleeping cells) and classify radio transmission points accordingly on the basis of their power consumption.

In one embodiment, the power consumption data is the only input to the classification model. In such embodiments, therefore, no additional sensors are required beyond those for measuring the power consumption of the radio transmission point. No data needs to be reported from terminal devices served by the radio transmission point, saving on complexity and network resources, while making the detection process more robust to errors.

Figure 2:
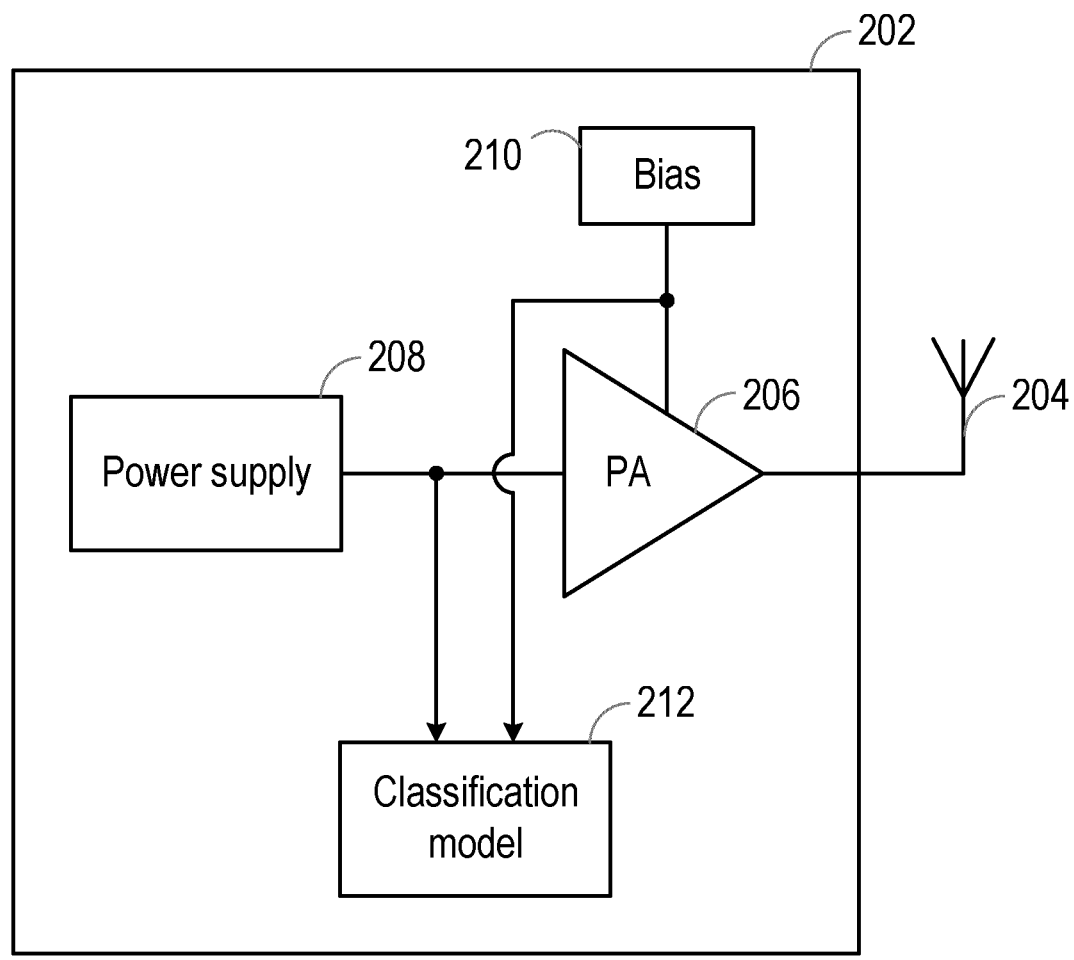
FIG. 2 is a schematic diagram of a radio transmission point arrangement according to embodiments of the disclosure.

FIG. 2 is a schematic diagram of a radio transmission point arrangement 200 according to embodiments of the disclosure. Again, those skilled in the art will appreciate that numerous components of the radio transmission point are omitted from the illustration for the sake of clarity. As embodiments of the disclosure relate to measurement of the power consumption of the radio transmission point, the illustration similarly concentrates on the power supply arrangements of the radio transmission point.

The arrangement comprises a radio transmission point 202 (e.g., a base station, or a radio transmission point forming part of a base station) having one or more antennas 204 for the transmission and reception of radio signals. Signals to be transmitted are provided to the antennas 204 via a power amplifier 206, which serves to amplify the signals prior to their transmission. The origin of these signals (i.e., the content of the signals, whether data or control signaling) is not illustrated in FIG. 2.

Power is supplied to the power amplifier 206 by a power supply 208. The power supply 208 will typically comprise a connection to a power grid, but may also or alternatively comprise one or more back-up supplies, such as generators (e.g. fossil fuel generators, solar cells, wind turbines, water turbines, etc) and high-capacity batteries. The power supply 208 may also comprise one or more power converters, such as a DC-DC converter to modulate the power output to suitable levels for the power amplifier 206.

The radio transmission point 202 further comprises bias circuitry 210, which is operable to provide a bias voltage to the signal to be amplified (e.g., so as to ensure that the signal remains in the linear region of the power amplifier 206). Although not illustrated, the biasing circuitry 210 may also be supplied with power from the power supply 208.

The arrangement 200 further comprises a classification model 212. The classification model 212 may be provided at the same site as the radio transmission point 202 or at the same site as a base station to which the radio transmission point belongs, or at a different site which is remote from the radio transmission point 202 or the base station.

The classification model 212 is operable to classify the radio transmission point 202 as serving one of a sleeping cell and a non-sleeping cell, based on the power consumption of the radio transmission point 202. The power consumption may be measured in various places, including the bias circuitry 210 and the power supply to the power amplifier 206. Thus the arrangement 200 comprises operative connections between the output of the power supply 208 to the power amplifier 206 (e.g., at a power supply rail of the power amplifier 206, or $V_{DD}$) and the classification model 212, and between the output of the bias circuitry 210 to the power amplifier 206 and the classification model 212. In alternative embodiments of the disclosure, the classification model 212 may comprise inputs from only one of these measurement points. It is expected that measurement of the bias voltage will provide better granularity than measurement at the power supply rail.

The power consumption of a radio transmission point will depend on a large number of factors (e.g., the number of connected devices, the size and shape of the cell, etc), and in general will incorporate power consumed as a result of transmitting reference signaling, data symbols.

FIGS. 3a and 3b show power consumption patterns of a radio transmission point in New Radio (NR) and Long Term Evolution (LTE) radio access technologies. Only power consumption as a result of reference signaling transmission (e.g. synchronization signals, system information broadcast, etc) is shown, for clarity. However, it can be seen that the regular transmission of reference signals results in regular peaks of power consumption in either radio access technology. Even with the addition of data transmissions to terminal devices served by the radio transmission point, the regular peaks corresponding to reference signal transmission can be identified (e.g. using one or more machine-learning techniques). Accordingly, the absence of regular transmission of reference signals can be an indicator of a sleeping cell.

Figure 4:
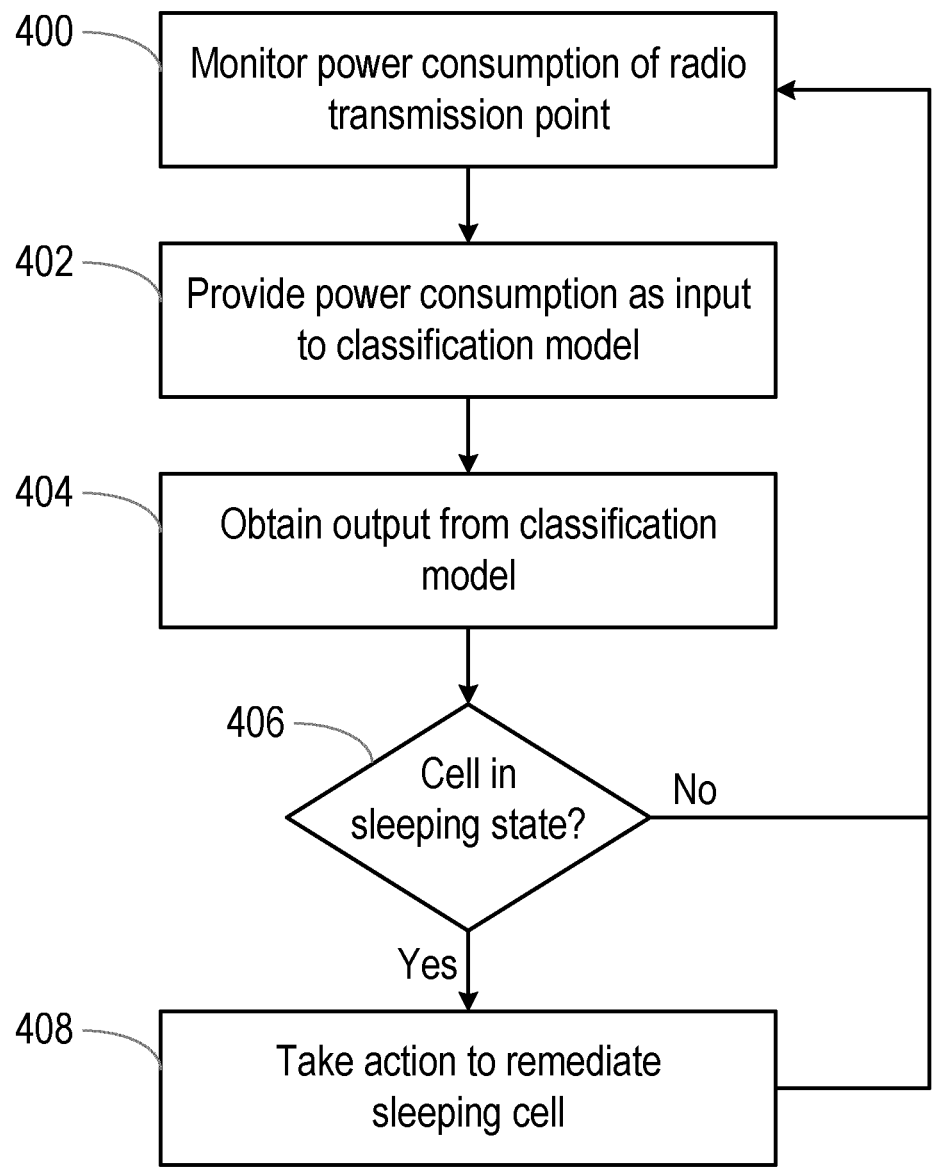
FIG. 4 is a flow chart of a method for detecting sleeping cells according to embodiments of the disclosure.

FIG. 4 is a flowchart of a method according to embodiments of the disclosure, in which a classification model is used to classify a radio transmission point as serving one of a sleeping cell and a non-sleeping cell. The method may be performed in the radio transmission point arrangement 200 described above with respect to FIG. 2, for example.

The method begins in step 400, in which the power consumption of the radio transmission point is monitored. As noted above, the power consumption may be measured at a power supply rail of a power amplifier in the radio transmission point, and/or a bias rail of the power amplifier, for example. The resulting data may be arranged as time-series data, comprising a sequence of values of the power consumption of the radio transmission point at successive points in time.

In step 402, the power consumption is provided as an input to a classification model (such as the classification model 212). The classification model is developed using a machine-learning algorithm (see FIG. 5). The classification model may be generic. However, in other embodiments, the classification model may be specific to the radio transmission point in one or more ways. For example, the classification model may be specific to a particular radio access technology employed by the radio transmission point (e.g., GSM, WCDMA, LTE, NR, etc). For example, the classification model may be specific to particular hardware employed in the radio transmission point, such as a particular power amplifier, or a particular antenna arrangement.

In a further alternative embodiment, the classification model may be specific to the radio transmission point itself. In such embodiments, the classification model may be received initially from a remote server (such as the server 108) before being trained locally at the radio transmission point, based on power consumption data of the radio transmission point itself (see also FIG. 5). In this way, the classification model is adapted based on the particular configuration of the radio transmission point itself.

In an extension of this embodiment, once trained locally, the classification model may be transmitted back to the remote server. With multiple radio transmission points transmitting respective classification models to the remote server, the remote server is able to amalgamate (or "stack") classification models from multiple radio transmission points to generate a final classification model. One method of stacking classification models is to average them. Respective final classification models may be generated for different radio access technologies, power amplifier hardware or software, etc. The final classification models may then be sent back to the relevant radio transmission points for implementation.

Figure 6:
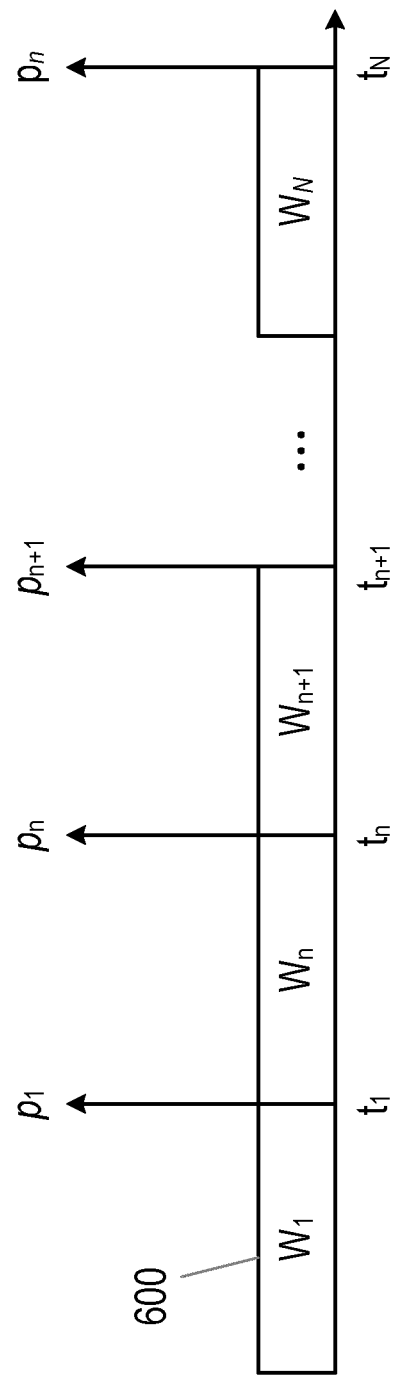
FIG. 6 is a schematic diagram of power consumption data according to embodiments of the disclosure.

FIG. 6 is a schematic diagram showing power consumption data according to embodiments of the disclosure. It will be noted that the power consumption data is arranged in a plurality of non-overlapping windows (marked $W_n$). Thus the power consumption data window $W_1$ ends at a time $t_1$, the power consumption data window $W_n$ ends at time $t_n$, and so on.

Returning to FIG. 4, in step 404, the classification model generates an output which maps the power consumption data to one of a sleeping cell and a non-sleeping cell. Thus in one embodiment the classification model is a binary classification model.

The classification model in one embodiment is thus configured to detect the presence of a sleeping cell or a non-sleeping cell based on the power consumption data. In one embodiment, the classification model receives as input the power consumption data for one window $W_n$, and generates a corresponding output $p_n$ for that window. Thus the decision as to whether the radio transmission point serves a sleeping cell or a non-sleeping cell may be based on a single window of data. The length of each window may be chosen so as achieve a high-level of confidence that the decision or output for a particular window is correct. For example, each window may be one second or more long. Outputs may be generated periodically (e.g., after each window), or non-periodically (e.g., event driven).

The classification model may operate within each window by predicting a next power consumption data value based on one, or typically several, preceding power consumption data values, assuming that the radio transmission point is serving (say) a non-sleeping cell. If the predicted value matches the actual value, then this is an indication that the radio transmission point is indeed serving a non-sleeping cell. If the predicted value does not match the actual value, then this is an indication that the radio transmission point is serving a sleeping cell. Note that this process may take place iteratively, with multiple data samples within each data window being predicted based on preceding data values, and then compared to the actual data values. A determination as to whether the data for the window as a whole is classified as a sleeping cell or a non-sleeping cell may then be based on a combination of these individual predictions. Thus the classification model may take as its inputs the actual data values within a particular window, and also the predicted values within the particular window, and classify the cell as sleeping or not based on those inputs.

In further embodiments, the classification model may additionally or alternatively be configured to predict that the radio transmission point will serve a sleeping cell or a non-sleeping cell, i.e., in future. Thus, in this embodiment the classification model generates an output which predicts, based on the power consumption data for a particular (e.g., current) data window, whether the radio transmission point will (e.g., is about to or within a period of time of the particular data window) serve a sleeping cell. Further detail regarding this embodiment is provided below.

In step 406, it is determined whether the output indicates that the radio transmission point is serving or will serve a sleeping cell. If the output of the classification model indicates that the radio transmission point is not serving a sleeping cell (or is not predicted to serve a sleeping cell), the method ends, or returns to step 400 in which the power consumption of the radio transmission point continues to be monitored.

If the output of the classification model indicates that the radio transmission point is serving a sleeping cell (or is predicted to serve a sleeping cell), the method moves to step 408, in which one or more actions are taken to remediate the sleeping state of the cell.

For example, one or more of the following actions may be taken:
1. Particularly where a future sleeping cell state is predicted, an indication of the sleeping cell state may be transmitted to a scheduler of the network, to activate reference signal output (e.g., synchronization Signal Block) and thereby prevent the sleeping cell state from occurring.
2. Power reset of the specific radio transmission point (e.g., power reset of the power amplifier 206).
3. Resetting a base station to which the radio transmission point belongs.

If a sleeping cell state is detected, a power reset of the specific radio transmission point may be actioned first, as this can be expected to take 10 ms to 100 ms and therefore service from the radio transmission point is only momentarily suspended. If this fails to remediate the problem, the base station may be reset. However, this can be expected to take 2-3 minutes, and therefore leads to significant loss of service.

Thus the disclosure provides a method whereby a classification model detects the presence of a sleeping cell in a cellular network based on power consumption data, and/or predicts the presence of a sleeping cell in a cellular network.

Figure 5:
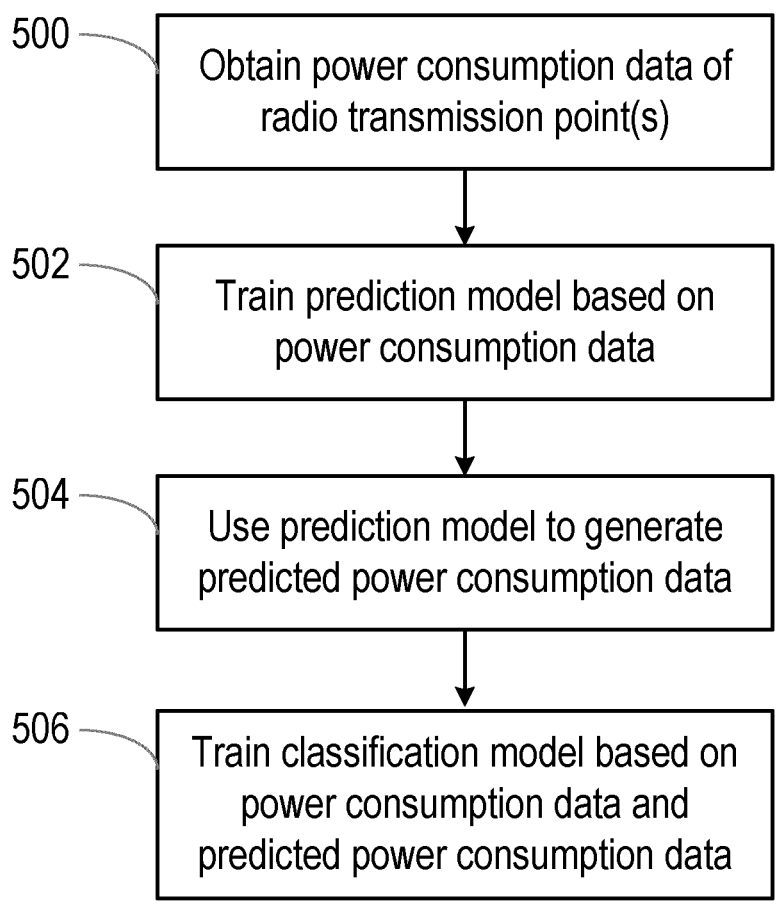
FIG. 5 is a flow chart of a method of training a classification model to detect sleeping cells according to embodiments of the disclosure.

FIG. 5 is a flowchart of a method of training a classification model to detect the presence of a sleeping cell in a cellular network, based on power consumption data.

The method begins in step 500, in which training data is acquired. The training data comprises power consumption data for radio transmission points, as described above. Thus, the power consumption data may be arranged into windows as shown in FIG. 6.

In step 502, a prediction model is trained, using a machine-learning algorithm, to predict values of the power consumption data based on one or more preceding values of that data. For example, the prediction model may be trained to predict a value $d_n$ based on a plurality of preceding values $d_{n-1}$, $d_{n-2}$, $d_{n-3}$, etc. Various machine-learning models are suitable for this task, including recurrent neural networks, such as long short-term memory (LSTM), and deep convolutional neural networks.

In step 504, once trained, the prediction model is used to predict values of power consumption data for one or more radio transmission points, based on further training data (which again comprises power consumption data for one or more radio transmission points). The further training data is labeled as corresponding to one of a sleeping cell and a non-sleeping cell.

In step 506, a classification model is trained, using a machine-learning algorithm and based on the further training data and also the predicted power consumption data generated in step 504, to classify the data as belonging to one of a sleeping cell and a non-sleeping cell. The classification model may therefore be a binary classification model. Thus the classification model may take as its inputs the power consumption data for one or more radio transmission points, and the predicted power consumption data generated based on that power consumption data.

As noted above, the training data is labeled (e.g., based on historical data or expert input) as representing a sleeping cell or a non-sleeping cell. Accordingly the classification model may be iteratively trained to produce an output y (i.e. sleeping cell or non-sleeping cell) based on inputs x (power consumption data and predicted power consumption data). Suitable machine-learning algorithms include state vector machines, recurrent neural networks, deep convolutional neural networks, etc.

The classification model development in step 506 typically has four phases: the training, development testing, real testing, and the real deployment to the product. The four phases may be in continuous iteration such that if the performance of the model degrades over time, it needs to be retrained. The model training may be done by fitting the input (power consumption) to the output (sleeping or non-sleeping cell), where some part (preferably equal amount of samples for each class) of the dataset is from a sleeping cell and the other part is from a non-sleeping cell. The model training may be performed on a first portion of the training dataset (e.g., 50%). Once the model fits with this first portion, the model is then applied to a second portion (e.g., the next 25%) of dataset, which contains a similar distribution. The classification outputs based on the second portion are compared to the ground truth values (the real labels telling the actual state of the cell; either sleeping or not sleeping). Hyper parameters of the classification model are adjusted, or different machine learning models are experimented with, based on the comparison. Eventually the classification model that yields the best accuracy is selected. Then, the selected model is applied to the real test set, which is a third portion of the full training data set (e.g., the last 25%). Ideally, the accuracy values obtained from the development test and the real test phases are similar. If not, the development phase may be iterated. The aim is to make the accuracies from the phases close to each other and at the same time as high as possible. Once the classification model is developed, it is deployed into the real product such that the model is ready to listen to real-time data to yield probabilities on whether the cell is in a sleeping state or not (e.g., in steps 402 and 404 described above).

The performance of the model may be evaluated by any well-known evaluation metrics. For binary classification models, f1-score, AuC ROC score, precision and recall metrics are often used. The choice of evaluation metrics may depend on the problem formulation.

The steps for training the classification model set out above with respect to FIG. 5 are optional. More generally, machine-learning algorithms such as simultaneous decomposition and classification networks may be able to decompose and classify power consumption data as belonging to one of a sleeping cell and a non-sleeping cell without separately predicting power consumption and then classifying based on the comparison between the predicted and actual power consumption data.

As noted above, the classification model in further embodiments may be trained to predict, based on a current power consumption for a radio transmission point, that the radio transmission point will serve a sleeping cell or a non-sleeping cell at some defined point in future. Such a classification model may be trained according to the method described above with respect to FIG. 5, but with the labels for the power consumption training dataset changed to reflect the ground truth (i.e. whether the radio transmission point serves a sleeping cell or a non-sleeping cell) at some defined point in the future. Thus, the ground truth for a data window w(t=n) in such embodiments is whether the radio transmission point serves a sleeping cell or a non-sleeping cell at some later time t=n+δ. Note that the prediction interval δ in this embodiment (e.g., the time offset between the power consumption data and the time at which the radio transmission point is predicted to serve one of a sleeping cell and a non-sleeping cell) may be determined through routine testing procedures.

Thus the present disclosure also provides methods, apparatus and computer-readable mediums for training a classification model to classify the power consumption data of a radio transmission point into one of a sleeping cell and a non-sleeping cell.

Figure 7:
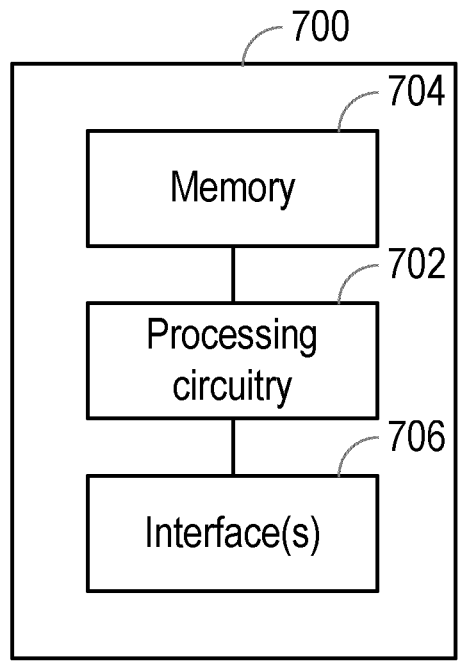
FIG. 7 is a schematic diagram of a network node according to embodiments of the disclosure.

FIG. 7 is a schematic diagram of a node 700 according to embodiments of the disclosure. The network node 700 may be configured to carry out the method described above with respect to FIG. 4, for example. In one embodiment, the network node 700 comprises a base station or a radio transmission point for a cellular network, such as the base stations 102, or the radio transmission point 202. Alternatively, the network node 700 may be implemented in a remote server, such as the server 108 described above with respect to FIG. 1.

The network node 700 comprises processing circuitry 702 and a machine-readable medium (such as memory) 704. The machine-readable medium stores instructions which, when executed by the processing circuitry 702, cause the network node 700 to: monitor power consumption of a radio transmission point of the cellular communication network; provide the power consumption of the radio transmission point as an input to a classification model, developed using a machine-learning algorithm; and obtain an output from the classification model, the output classifying the radio transmission point as serving one of a sleeping cell and a non-sleeping cell.

In the illustrated embodiment, the network node 700 also comprises one or more interfaces 706, for receiving signals from other nodes of the network and/or transmitting signals to other nodes of the network. The interfaces 706 may use any appropriate communication technology, such as electronic signaling, optical signaling or wireless (radio) signaling.

In the illustrated embodiment, the processing circuitry 702, the machine-readable medium 704 and the interfaces 706 are operatively coupled to each other in series. In other embodiments, these components may be coupled to each other in a different fashion, either directly or indirectly. For example, the components may be coupled to each other via a system bus or other communication line.

Figure 8:
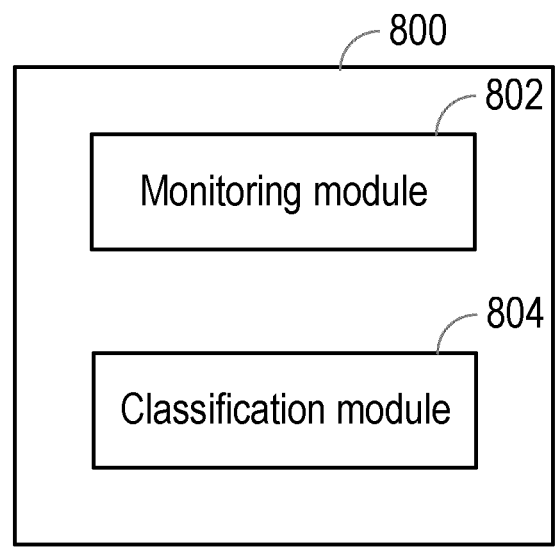
FIG. 8 is a schematic diagram of a network node according to further embodiments of the disclosure.

FIG. 8 is a schematic diagram of a network node 800 according to embodiments of the disclosure. The network node 800 may be configured to carry out the method described above with respect to FIG. 4, for example. In one embodiment, the network node 800 comprises a base station or a radio transmission point for a cellular network, such as the base stations 102, or the radio transmission point 202. Alternatively, the network node 800 may be implemented in a remote server, such as the server 108 described above with respect to FIG. 1.

The network node 800 comprises a monitoring module 802 and a classification module 804. The monitoring module 802 is configured to monitor power consumption of a radio transmission point of the cellular communication network. The power consumption of the radio transmission point is provided as an input to the classification module 804, which implements a classification model, developed using a machine-learning algorithm, and obtains an output from the classification model, the output classifying the radio transmission point as serving one of a sleeping cell and a non-sleeping cell.

The network node 800 may also comprise one or more interface modules (not illustrated), for receiving signals from other nodes of the network and/or transmitting signals to other nodes of the network. The interfaces may use any appropriate communication technology, such as electronic signaling, optical signaling or wireless (radio) signaling.

The modules described above with respect to FIG. 8 may comprise any combination of hardware and/or software. For example, in one embodiment, the modules are implemented entirely in hardware. As noted above, hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions. In another embodiment, the modules may be implemented entirely in software. In yet further embodiments, the modules may be implemented in combinations of hardware and software.

The present disclosure therefore provides methods, apparatus and machine-readable mediums for the detection of sleeping cells in a cellular network. The disclosure also provides methods, apparatus and machine-readable mediums for training a classification model to detect sleeping cells in a cellular network.

It should be noted that the above-mentioned embodiments illustrate rather than limit the concepts disclosed herein, and that those skilled in the art will be able to design many alternative embodiments without departing from the scope of the appended following claims. The word "comprising" does not exclude the presence of elements or steps other than those listed in a statement, "a" or "an" does not exclude a plurality, and a single processor or other unit may fulfill the functions of several units recited in the statements. Any reference signs in the claims shall not be construed so as to limit their scope.

The invention claimed is:

1. A method of detecting a sleeping cell in a cellular communication network, the method comprising:
   monitoring, by a radio transmission point, power consumption of the radio transmission point of the cellular communication network;
   providing, by the radio transmission point, the power consumption of the radio transmission point as an input to a classification model located at the radio transmission point, developed using a machine-learning algorithm, wherein the classification model is a final classification model that is generated by amalgamating a plurality of locally trained classification models obtained from a plurality of radio transmission points; and
   obtaining, by the radio transmission point, an output from the classification model, the output classifying the radio transmission point as serving one of a sleeping cell and a non-sleeping cell, wherein a power reset of the radio transmission point or a power amplifier of the radio transmission point is initiated in response to the radio transmission point being classified as a sleeping cell.

2. The method of claim 1, wherein the classification model comprises a first part, developed using the machine-learning algorithm, for predicting a future power consumption pattern of the radio transmission point based on the monitored power consumption, and a second part for comparing the future power consumption to a measured power consumption and classifying the radio transmission point as serving one of a sleeping cell and a non-sleeping cell based on the comparison.

3. The method of claim 2, wherein the second part of the classification model is also developed using a machine-learning algorithm.

4. The method of claim 1, wherein the output of the classification model relates to a prediction that the radio transmission point will serve one of a sleeping cell and a non-sleeping cell.

5. The method of claim 1, wherein the power consumption of the radio transmission point is monitored at a power amplifier of the radio transmission point.

6. The method of claim 5, wherein the power consumption of the radio transmission point is monitored via one or more of a supply rail of the power amplifier and a biasing voltage rail of the power amplifier.

7. The method of claim 1, wherein the power consumption of the radio transmission point is the only input to the classification model.

8. The method of claim 1, wherein the power consumption is monitored as time-series data in a time window, and wherein the time-series data is provided as an input to the classification model.

9. The method of claim 8, wherein the output of the classification model classifies the power consumption in the time window as relating to one of a sleeping cell and a non-sleeping cell.

10. The method of claim 1, further comprising obtaining an output from the classification model periodically.

11. The method of claim 1, wherein the machine-learning algorithm comprises a recurrent neural network.

12. The method of claim 1, further comprising, responsive to a determination that the radio transmission point is serving a sleeping cell, initiating an action to remediate the sleeping cell.

13. The method of claim 12, wherein the action comprises one or more of:
   transmitting an indication of the sleeping cell to a scheduler of the cellular communication network;

resetting the radio transmission point; and resetting a base station to which the radio transmission point belongs.

14. The method of claim 1, further comprising updating the classification model based on the input and the output.

15. The method of claim 14, further comprising transmitting the updated classification model to a remote server.

16. The method of claim 1, further comprising receiving the classification model from a remote server.

17. A network node for detecting a sleeping cell in a cellular communication network, the network node comprising processing circuitry and a non-transitory computer-readable medium storing instructions which, when executed by the processing circuitry, cause the network node to:

monitor power consumption of a radio transmission point of the cellular communication network, wherein the network node includes the radio transmission point;

provide the power consumption of the radio transmission point as an input to a classification model, developed using a machine-learning algorithm, wherein the classification model is a final classification model that is generated by amalgamating a plurality of locally trained classification models obtained from a plurality of radio transmission points; and obtain an output from the classification model, the output classifying the radio transmission point as serving one of a sleeping cell and a non-sleeping cell, wherein a power reset of the radio transmission point or a power amplifier of the radio transmission point is initiated in response to the radio transmission point being classified as a sleeping cell.

18. The network node of claim 17, wherein the classification model comprises a first part, developed using the machine-learning algorithm, for predicting a future power consumption pattern of the radio transmission point based on the monitored power consumption, and a second part for comparing the future power consumption to a measured power consumption and classifying the radio transmission point as serving one of a sleeping cell and a non-sleeping cell based on the comparison.

19. The network node of claim 17, wherein the network node is further caused to, responsive to a determination that the radio transmission point is serving a sleeping cell, initiate an action to remediate the sleeping cell.

20. A non-transitory computer-readable medium storing instructions which, when executed by processing circuitry of a network node of a cellular communication network, cause the network node to:

monitor power consumption of a radio transmission point of the cellular communication network, wherein the network node includes the radio transmission point;

provide the power consumption of the radio transmission point as an input to a classification model, developed using a machine-learning algorithm, wherein the classification model is a final classification model that is generated by amalgamating a plurality of locally trained classification models obtained from a plurality of radio transmission points; and obtain an output from the classification model, the output classifying the radio transmission point as serving one of a sleeping cell and a non-sleeping cell, wherein a power reset of the radio transmission point or a power amplifier of the radio transmission point is initiated in response to the radio transmission point being classified as a sleeping cell.

* * * * *